United States Patent [19]

Shiotani

[11] Patent Number: 4,968,214

[45] Date of Patent: Nov. 6, 1990

[54] APPARATUS FOR AUTOMATICALLY TAKING OUT A MOLDED PRODUCT

[75] Inventor: Yosuke Shiotani, Nagoya, Japan

[73] Assignee: Star Seiki Co., Ltd., Aichi, Japan

[21] Appl. No.: 283,226

[22] Filed: Dec. 12, 1988

[30] Foreign Application Priority Data

Apr. 20, 1988 [JP] Japan ................................. 63-97875

[51] Int. Cl.$^5$ .............................................. B25J 5/00
[52] U.S. Cl. ..................................... 414/751; 74/89.2; 74/89.17; 74/110; 74/479; 901/21; 901/16
[58] Field of Search ................ 414/751, 749, 752, 753; 901/21, 25, 16; 74/89.2, 89.17, 110, 479

[56] References Cited

U.S. PATENT DOCUMENTS

| 3,892,324 | 7/1975 | Faletti, Jr. ........................... 414/749 |
| 4,583,909 | 4/1986 | Yamashita et al. ................. 901/16 X |
| 4,704,913 | 11/1987 | Zimmer ................................ 74/89.17 |
| 4,770,598 | 9/1988 | Kotani ................................... 414/752 |

FOREIGN PATENT DOCUMENTS

| 3709845 | 10/1988 | Fed. Rep. of Germany ........ 901/16 |
| 1355476 | 11/1987 | U.S.S.R. .................................. 901/21 |

Primary Examiner—David A. Bucci
Assistant Examiner—Donald W. Underwood
Attorney, Agent, or Firm—Frishauf, Holtz, Goodman & Woodward

[57] ABSTRACT

Apparatus for automatically taking out a molded product, includes an elongated main frame, a laterally movable body supported on the main frame and movable in the longitudinal direction of the main frame, a first drive device for reciprocally moving the laterally movable body relative to the main frame. A frontward-backward movable body is supported on a frontward-backward frame which is connected to the laterally movable body, the frontward-backward movable body being movable in a direction which is substantially perpendicular to the longitudinal direction of the main frame. A lifting device is provided, which includes a drive member connected to the frontward-backward movable body and having a vertically directed axis, a first driven member connected to the frontward-backward movable body and also connected to a rotary member which is rotatably supported on the movable frame. An attachment frame is supported on the movable frame and is movable in a vertical direction. A second driven member is connected to the attachment frame and to the rotatable member. The chuck is connected to the attachment for vertical movement thereof.

3 Claims, 8 Drawing Sheets

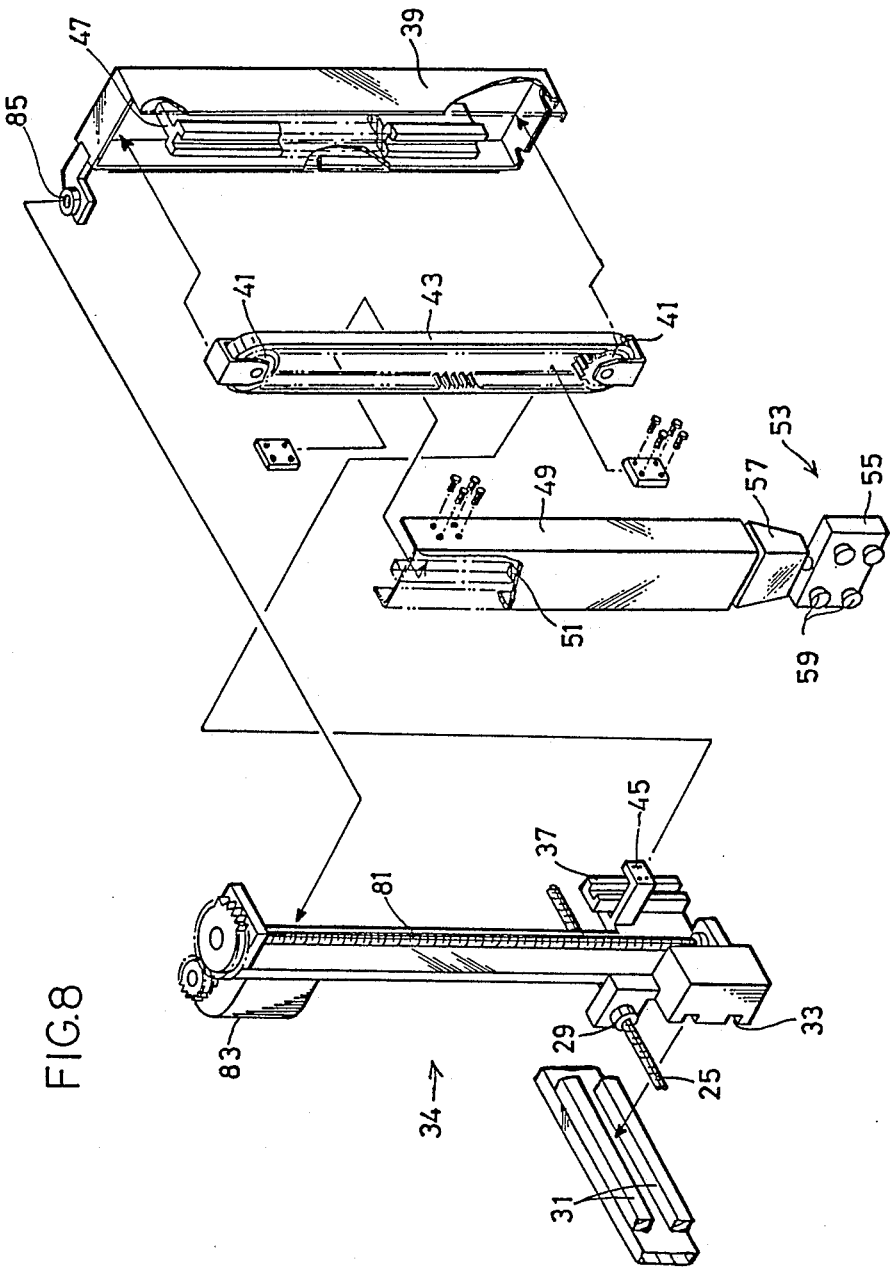

0
APPARATUS FOR AUTOMATICALLY TAKING OUT A MOLDED PRODUCT

BACKGROUND OF THE INVENTION

The present invention relates to a manipulator provided with a moving mechanism for vertical moving a chuck member to a predetermined position.

In an apparatus for automatically taking out a molded product from a mold, there are provided moving mechanisms each for moving the molded product in a lateral direction, a frontward and a backward direction, and a vertical direction. In a known mechanism, the vertical moving mechanism comprises a vertical cylinder attached to a frontward and backward moving body movably mounted on a frame extending in the frontward and backward direction and a chuck member which is movable between upper and lower positions for holding the molded product in response to actuation of the vertical cylinder.

However, according to the above-described moving mechanism, a vertical cylinder having an elongated axial length is required so as to move the chuck member by a long vertical stroke, and therefore, a resultant mechanism becomes bulky. On the other hand, there has been proposed another mechanism in which a plurality of vertical cylinders are connected in series to overcome this deficiency. However, with the latter structure, the total weight of the vertically movable cylinders becomes large, and the chuck member may be vibrated upon termination of the vertical movement. Accordingly, a subsequent operation cannot be conducted until the vibration is attenuated, to thereby disadvantageously prolong the entire working period.

OBJECTS OF THE INVENTION

It is therefore an object of the this invention to provide an improved apparatus for automatically taking out a molded product having a vertically moving mechanism capable of moving a chuck member over a large distance while employing a drive means which provides a short stroke.

Another object of this invention is to provide such apparatus for automatically taking out a molded product in which a vertically moving mechanism for moving the chuck member is compact in size and light in weight, to thereby attain high responsiveness.

SUMMARY OF THE INVENTION

In accordance with the present invention, apparatus for automatically taking out a molded product, includes a main frame extending in a lateral direction; a lateral movable body supported on the main frame; first drive means for reciprocally moving the lateral movable body in the long direction of the main frame; a frontward-backward movable body supported on a frontward-backward frame that is coupled to the lateral movable body, the frontward-backward direction being substantially perpendicular to the lateral direction; second drive means for moving the frontward-backward movable body; and chuck means for holding a molded product and for moving the molded product to a predetermined position, the chuck means being connected to an attachment frame. Also included is lifting means comprising vertical drive means coupled to the frontward-backward movable body and having an axis extending in a vertical direction, the vertical drive means having an axial length one-half the vertical moving stroke of the chuck means; a first movable frame coupled to the vertical drive means and supported on the frontward-backward movable body, the first movable frame being movable in a vertical direction and having a vertical length one-half the vertical moving stroke of the chuck means; a pair of pulleys rotatably supported on upper and lower end portions of the first movable frame; an endless belt trained over the pair of pulleys, the belt having a part coupled to the frontward-backward movable body; the attachment frame supported on the first movable frame and movable in a vertical direction, the attachment frame having a part coupled to the belt and having a vertical length one-half the vertical stroke of the chuck means.

BRIEF DESCRIPTION OF THE DRAWINGS

The accompanying drawings show an apparatus for automatically taking out a molded product from a mold according to this invention, in which:

FIG. 8 is an exploded segmental perspective view showing a vertical moving mechanism according to this invention.

DETAILED DESCRIPTION

Figure 1:
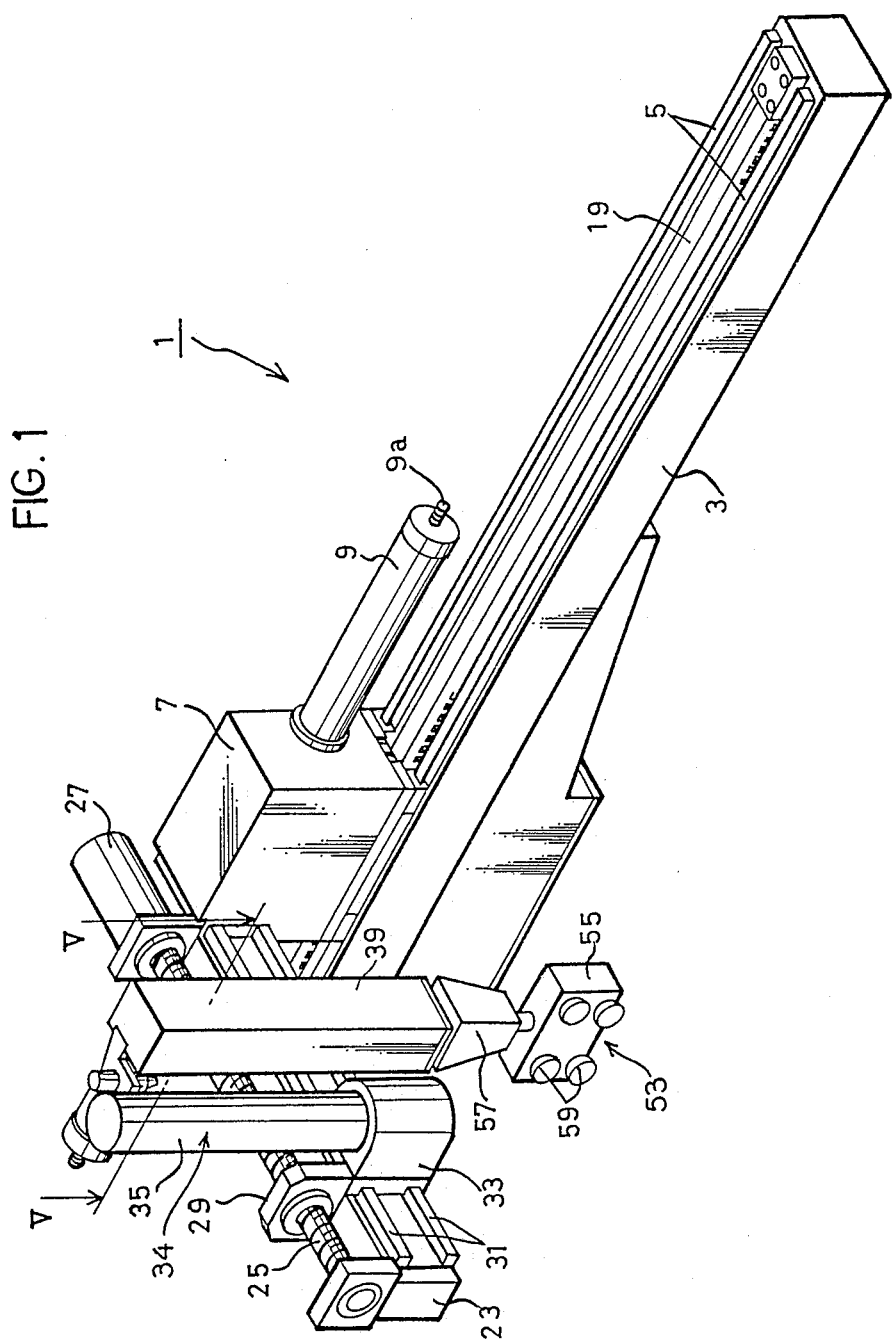
FIG. 1 is a perspective view showing an apparatus for automatically taking out a molded product.
Figure 2:
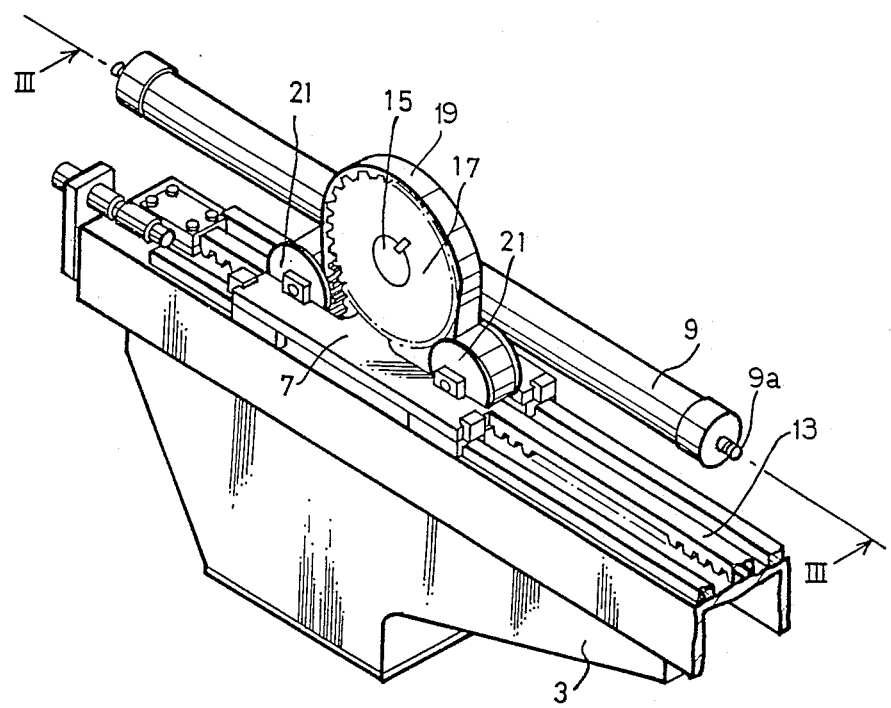
FIG. 2 is a segmental perspective view showing a horizontally moving mechanism.
Figure 3:
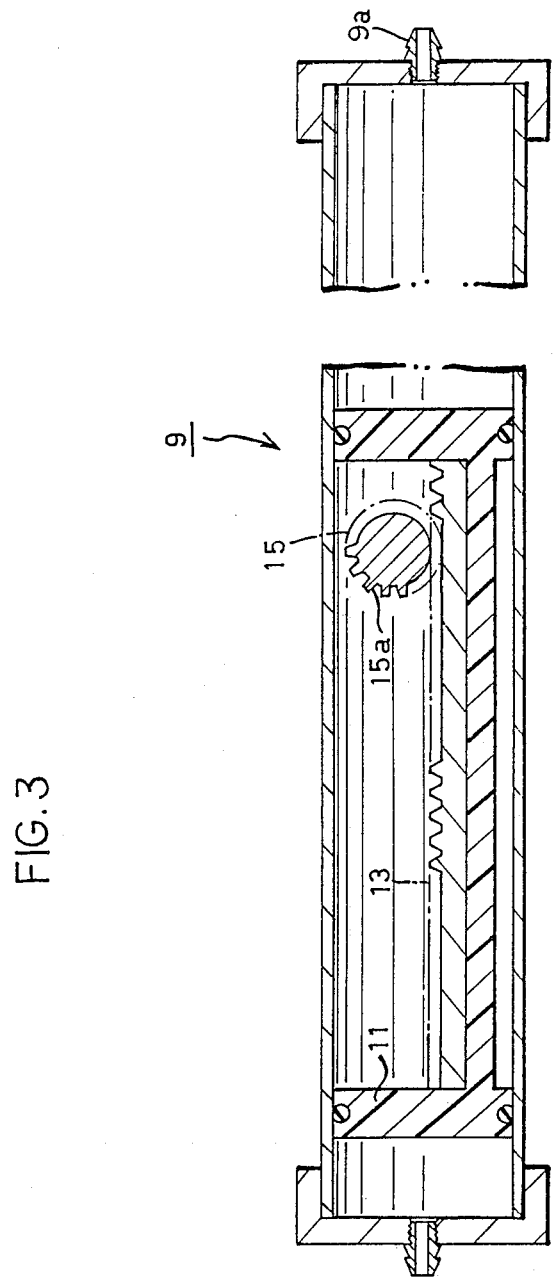
FIG. 3 is a vertical cross-sectional elevational view taken along line III—III of FIG. 2.
Figure 4:
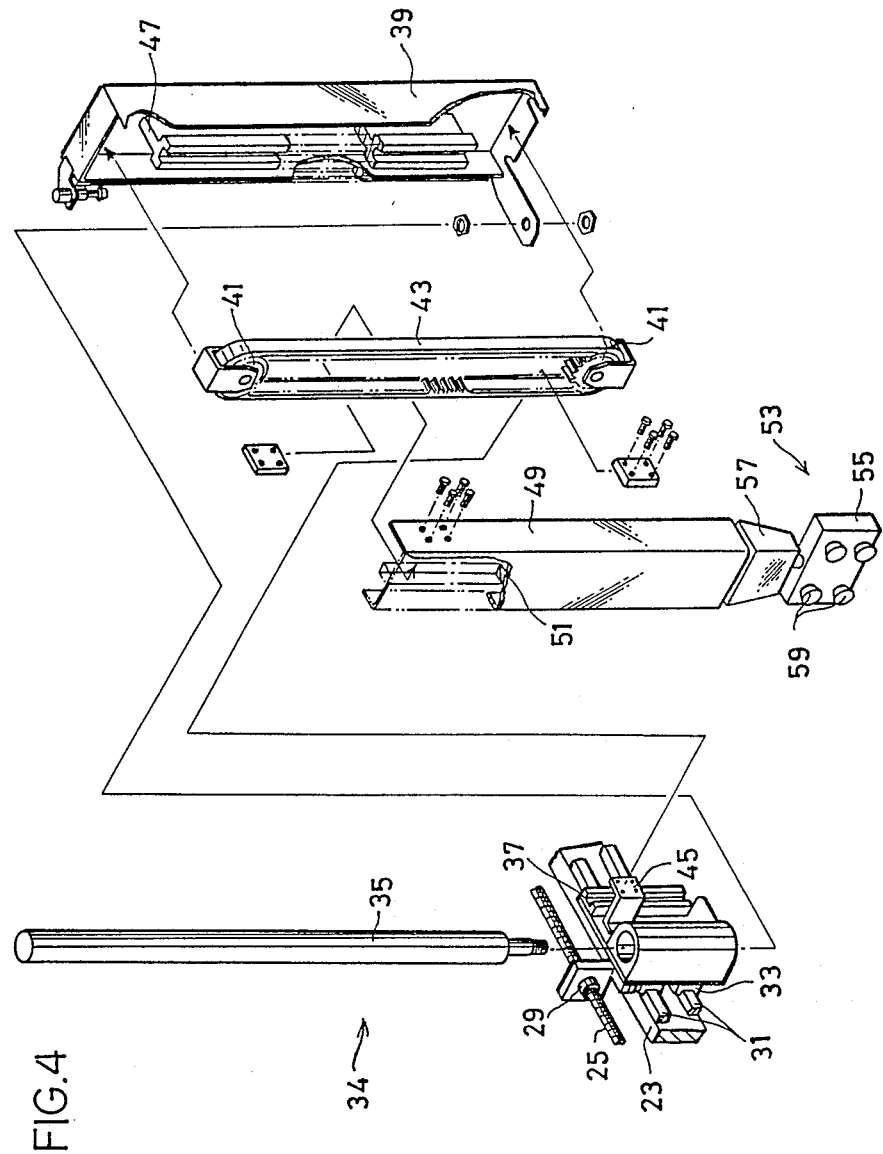
FIG. 4 is an exploded segmental perspective view showing a vertical moving mechanism.
Figure 5:
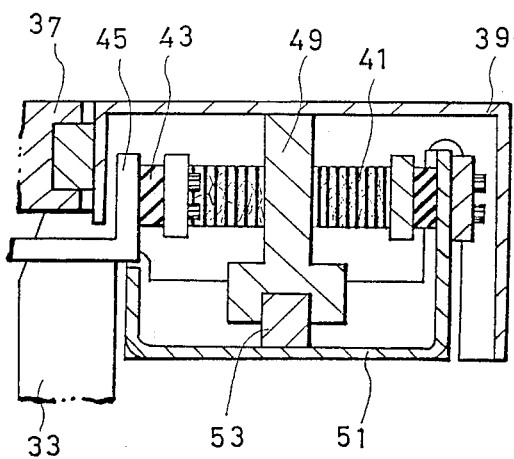
FIG. 5 is a transverse cross-sectional view taken along line V—V of FIG. 1.

Apparatus for automatically taking out a molded product according to this invention will be described with reference to the accompanying drawings.

As shown in FIGS. 1 through 5, an automatic molded product taking out apparatus 1 is provided in association with a molding portion of an injection molding machine (not shown), and a chuck member 53 to be described later is moved in three dimensions, such as the lateral direction, the frontward-backward direction, and the vertical direction so as to move a molded product as a workpiece to a predetermined position.

The automatic molded product taking out apparatus 1 has a main frame 3 having a length capable of bridging between a molded product taking out position and releasing position in respect to a horizontal direction. At an upper surface of the main frame, a pair of rails 5 spaced apart from each other by a predetermined distance are installed and extend in the longitudinal direction of the frame (leftward and rightward direction in FIG. 1.) Further, a laterally moving body 7 is slidably supported on the rails 5. The moving body 7 is provided with a rodless cylinder 9.

In the rodless cylinder 9, a piston 11 is disposed slidable in an axial direction thereof. The piston 11 has its axial length corresponding to a running stroke of the laterally moving body 7. Between distal ends of the piston 11, a rack gear 13 is formed whose spiral direction extends in the axial direction of the piston. An axial length of the rack gear 13 is determined in view of a speed change ratio with respect to the outer teeth 15a of a drive shaft 15 to be described later, and is also determined in such a manner that the laterally moving body 7 can be movable between the leftmost and rightmost positions of the main frame 3. At an axially intermediate portion of the rodless cylinder 9, a drive shaft 15 is rotatably supported. The drive shaft 15 is formed with outer teeth 15a meshedly engageable with the rack gear 13. When a pneumatic pressure is applied to the rodless cylinder 9 through nozzle 9a, the rack gear 13 of the piston 11 is moved, so that the drive shaft 15 is rotated about its axis at a speed change ratio defined by gear teeth numbers of the outer teeth 15a and the rack gear 13. A toothed pulley 17 is connected at one end portion of the drive shaft 15, the toothed pulley 17 having a timing belt 19 mounted thereto. The timing belt 19 constitutes a part of a first drive means whose each end portions are fixed to the leftmost and rightmost portions of the main frame 3. A pair of tension rollers 21 are rotatably supported to the main frame 7 so that the toothed pulley 17 is positioned between the rollers, and the timing belt 19 is pressurizingly pressed by these tension rollers, to thereby apply tension to the timing belt 19.

A frontward-backward frame 23 is secured to the laterally moving body 7 and extends in a direction perpendicular to the longitudinal direction of the main frame 3. The frontward-backward frame 23 rotatably supports a feed screw 25 whose axis extends in the frontward and backward direction, and which feed screw constitutes a part of a second drive means. An electric motor 27 is mounted on the laterally moving body 7, and is coupled to one end of the feed screw 25. Further, a nut member 29 is threadingly engaged with the feed screw 25, so that the nut member 29 is reciprocally movable along the axial direction of the feed screw 25 in response to a rotation of the feed screw 25. Furthermore, a pair of upper and lower rails 31 extending in the frontward-backward direction are mounted to a side face of the frontward-backward frame 23, and frontward-backward moving body 33 is slidably disposed on the rails 31, which body 33 is slidably movable in the frontward-backward direction. The frontward-backward moving body 33 is fixedly secured to the nut member 29, so that the body 33 is frontwardly and backwardly movable in response to the rotation of the feed screw 25.

A lifting means 34 is mounted to the frontward-backward moving body 33. The lifting means 34 comprises a vertical cylinder 35 as a vertical drive means whose axis extends in the vertical direction. The vertical cylinder 35 has an axial length half the moving stroke of a chuck member 53 which is to be described later. Further, at the side surface of the frontward-backward moving body 33, a vertical guide 37 (see FIG. 4) having a U-shaped cross-section is attached. The vertical guide 37 supports a movable frame 39 which is slidable in the vertical direction, and whose lower end is connected to the vertical cylinder 35. Each one of a pair of upper and lower toothed pulleys 41 which constitute a rotational member is rotatably supported to each of the upper and lower end portions of the movable frame 39, and an endless timing belt 43 is trained over the upper and lower toothed pulleys 41 and 41. A part of the timing belt 43 is fixed to a stay 45 of the above described frontward-backward moving member 33. With this structure, when the movable frame 39 is moved in the vertical direction in accordance with the actuation of the vertical cylinder 35, the timing belt 43 is driven in the vertical direction upon rotation of the toothed pulleys 41. A guide 47 is attached to the movable frame 39 along the length between the pulleys 41 and 41. A rail 51 of an attachment frame 49 is supported slidably in the vertical direction on the guide 47. A part of the attachment frame 49 is fixed to the timing belt 43.

A chuck attaching plate 55 which constitutes a part of the chuck member 53 is provided at the lower end of the attachment frame 49 through a posture control member 57. The posture control member is adapted to inversely rotate the chuck attaching member 55 by means of a pneumatic cylinder and a link mechanism (not shown) which are included in the control member. The chuck attaching plate 55 is provided with a plurality of suction members 56 so as to suckingly hold a molded product by means of suction.

Next, operation of the automatic molded product taking out apparatus thus constructed with be described.

Figure 6:
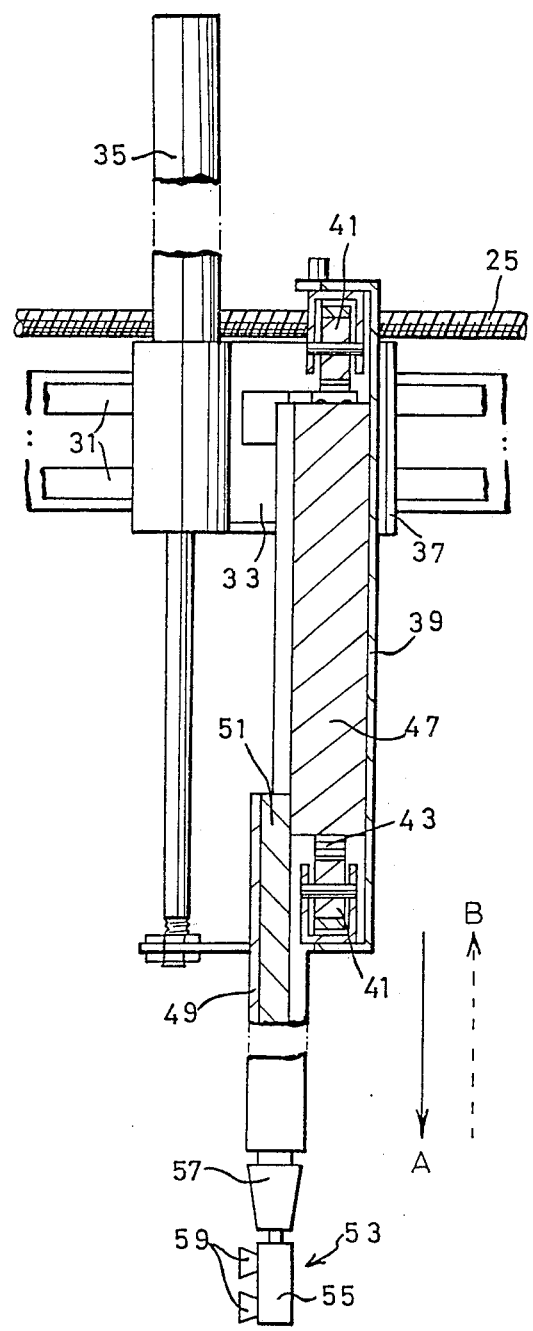
FIG. 6 is a vertical cross-sectional view showing a chuck member in its downwardly moving state.
Figure 7:
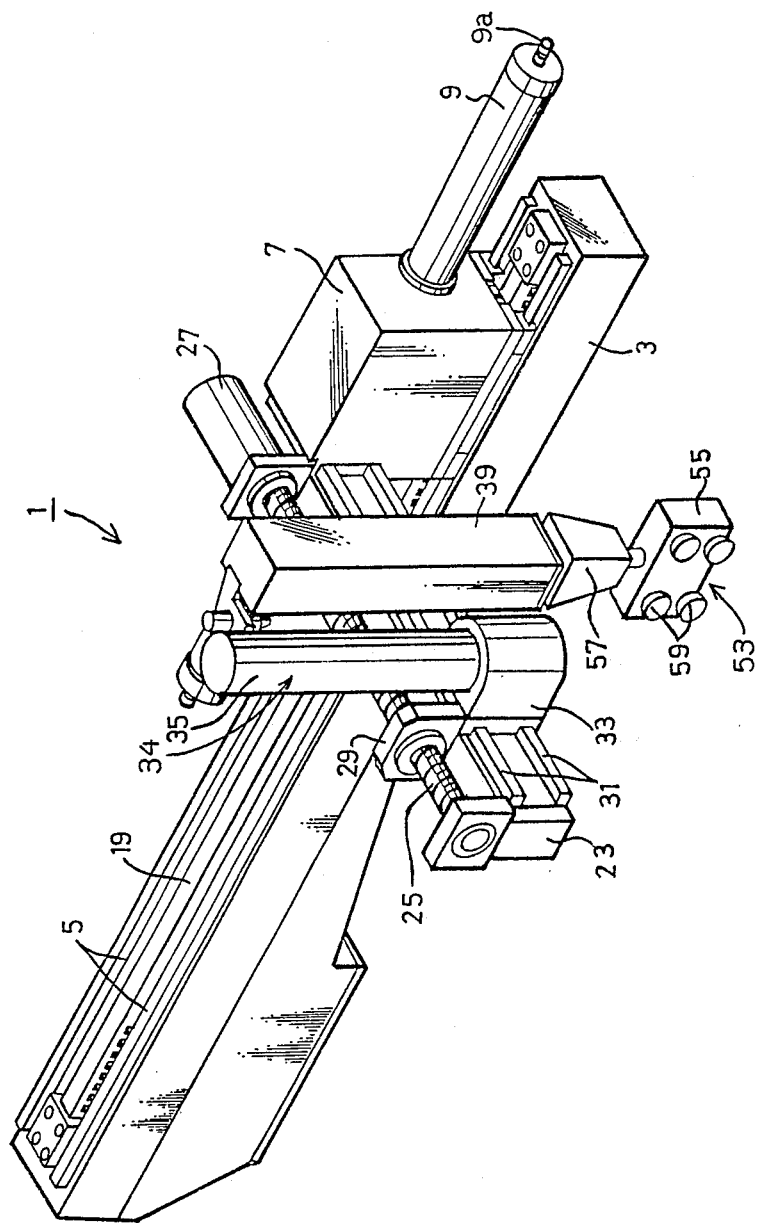
FIG. 7 is a perspective view showing a moving state of the apparatus for automatically taking out the molded product.

As shown in FIGS. 1, 6 and 7, when the vertical cylinder 35 is actuated downwardly while the chuck member 53 is positioned above the molded part, the movable frame 39 connected to the vertical cylinder 35 is moved downwardly. In this instance, the toothed pulley 41 is rotated in a predetermined direction in accordance with the downward travel of the movable frame 39, so that the timing belt 43 is moved downwardly, since a part of the timing belt 43 is fixed to the frontward-backward moving body 33. When the timing belt 43 is moved in the direction indicated by a solid line arrow A shown in FIG. 6, the attachment frame 49 fixed to the timing belt 43 is moved downwardly, so that the chuck member 53 is brought into confrontation with a metal mold which is open to expose the molded product. By this operation, the chuck member 53 is moved downwardly by a moving distance of the vertical cylinder 35 and the toothed belt 43 in accordance with the actuation of the vertical cylinder 35.

Upon confrontation of the chuck member 53 with the metal mold by the above described operation, the frontward-backward moving body 33 is moved by the rotation of the feed screw 25 driven by the motor 27 in such a manner that the suction members 59 are brought into abutment with the molded product confined in the open metal mold, and the molded product is suckingly held by the suction members 59. After the above-described operation, the frontward-backward moving body 33 is returned to its original position by the feed screw 25 which is rotated in the reverse direction by the reverse rotation of the electric motor 27, so that the molded product held by the suction members 59 is taken out of the metal mold. After withdrawal of the molded product from the metal mold, the vertical cylinder 35 is actuated to be restored to its original position, so that the timing belt 43 is moved in a direction indicated by a broken arrow B in FIG. 6 in accordance with the upward movement of the movable frame 39. By this movement, the attachment frame 49 is moved upwardly in accordance with the movement of the timing belt 43, and therefore, the chuck member 53 holding the molded product is moved to its upper position.

After the above operation, upon actuation of the rodless cylinder 9, the drive shaft 15 is rotated in a clockwise direction in accordance with the movement of the piston 11 in the leftward direction. In this case, since the end portion of the timing belt 19 is meshedly engaged with the toothed pulley is fixed to both ends of the main frame 3, the moving body 7 is moved in a horizontal direction from a position shown in FIG. 1 to a position shown in FIG. 7 so as to move the chuck member 53 to is release position. After the above operation, the chuck member 53 is moved to a position in the vicinity of the predetermined release position by the selective actuations of the vertical cylinder 35 and the electric motor 27. In this state, the posture control member 57 is selectively operated so as to reversely rotate the chuck member 53. By this operation, the molded product held by the suction members 59 is brought into confrontation with the taking out surface at the release position. Then the suction to the molded product by the suction members 59 is terminated so as to release the molded product, to thus complete the taking out operation.

According to another embodiment of the present invention, instead of the vertical cylinder 35, a feed screw 81 which is coupled to the electric motor 83 and having its axis extending in the vertical direction is coupled to the frontward-backward moving body 33 as shown in FIG. 8, and nut member 85 engageable with the feed screw 81 is attached to the movable frame 39. Upon rotation of the feed screw, the movable frame 39 is moved in the vertical direction.

I claim:

1. Apparatus for automatically taking out a molded product, comprising:
   a main frame extending in a lateral direction;
   a lateral movable body supported on the main frame;
   first drive means for reciprocally moving the lateral movable body in the long direction of the main frame;
   a frontward-backward movable body supported on a frontward-backward frame that is coupled to the lateral movable body, the frontward-backward direction being substantially perpendicular to the lateral direction;
   second drive means for moving the frontward-backward movable body; and
   chuck means for holding a molded product and for moving the molded product to a predetermined position, the chuck means being connected to an attachment frame and having a vertical moving stroke; and
   lifting means comprising:
   vertical drive means coupled to the frontward-backward movable body and having an axis extending in a vertical direction, the vertical drive means having an axial length one-half the vertical moving stroke of the chuck means;
   a first movable frame coupled to the vertical drive means and supported on the frontward-backward movable body, the first movable frame being movable in a vertical direction and having a vertical length one-half the vertical moving stroke of the chuck means;
   a pair of pulleys rotatably supported on upper and lower end portions of the first movable frame;
   an endless belt trained over the pair of pulleys, the belt having a part coupled to the frontward-backward movable body;
   the attachment frame being supported on the first movable frame and movable in a vertical direction, the attachment frame having a part coupled to the belt and having a vertical length one-half the vertical stroke of the chuck means.

2. Apparatus for automatically taking out a molded product according to claim 1, wherein said vertical drive means comprises:
   a cylinder having an axis extending in a vertical direction and having an axial length one-half the vertical moving stroke of said chuck means.

3. Apparatus for automatically taking out a molded product according to claim 1, wherein said vertical drive means comprises:
   a feed screw rotatably supported on two ends of said frontward-backward frame and having an axial length one-half the vertical moving stroke of said chuck means;
   a nut member engaged with said feed screw and coupled to said frontward-backward movable body; and
   motor means for rotating said feed screw to actuate said lifting means.

* * * * *